United States Patent Office 2,955,040
Patented Oct. 4, 1960

2,955,040

NUT FLAVORING ADDITIVES

Fitzhugh L. Avera, Alameda, Calif., assignor to Corn Products Company, a corporation of Delaware No Drawing. Original application June 28, 1954, Ser. No. 439,856, now Patent No. 2,860,053, dated Nov. 11, 1958. Divided and this application July 14, 1958, Ser. No. 748,110

12 Claims. (Cl. 99—128)

The invention, in general, relates to food products and more particularly relates to a flavoring base which while suitable in itself as a food condiment or spread is especially desirable as an additive to a variety of comestibles.

This application is a division of my co-pending application, Serial No. 439,856, filed June 28, 1954, and entitled "Nut Products," now Patent No. 2,860,053.

While any of the wide variety of nuts, including peanuts, almonds, walnuts, filberts, pecans and cashew nuts may be employed, in comminuted form, as one component of my improved additives, for purposes of explanation and brevity solely the invention will hereinafter be described with relation to a flavoring additive containing comminuted peanuts as one component thereof.

All nut products or nut bearing products, as is probably well known, have a tendency to develop undesirable odors and flavors. Moreover, when such products are exposed to water or water vapor, or when used in aqueous bearing media, undesirable browning of the products ensues. Further, a change in the physical state of the nut products or nut bearing products, suggesting coagulation, sometimes will occur. The present invention is directed to the provision of nut flavoring additives which, when combined with other foods, inhibits the development of the foregoing deleterious factors and, moreover, provide favorable behavior characteristics where the food containing my nut flavoring additives is in the presence of or exposed to water or water vapor.

A primary object of my invention is to provide a nut flavoring additive which is capable of being freely mixed with foods of various kinds and which obviates the development of distasteful flavors or odors in the end products.

Another important object of the invention is to provide a nut flavoring additive of the indicated nature which is additionally characterized by its capability of precluding undesirable browning of foods with which it is mixed, especially with respect to foods prepared in the presence of water or which may become exposed to water or water vapor.

A still further object of the invention is to provide a nut flavoring additive of the aforementioned character which in itself is entirely suitable as a condiment or spread in conjunction with other foods.

Other objects of the invention, together with some of the advantageous features thereof, will appear from the following description of a preferred embodiment and certain modified embodiments of the invention. It is to be understood, however, that I am not to be limited to the precise embodiments described, nor to the precise components thereof, as my invention, as defined in the appended claims, can be embodied in a plurality and variety of forms.

In its preferred form, the nut flavoring additive of my invention preferably comprises a nut butter combined with an aqueous solution of an edible polyhydric alcohol. A modified form of the present invention preferably comprises a nut butter combined with an aqueous solution of an edible polyhydric alcohol wherein the latter constitutes a major portion of the additive.

While there are known in the art a variety of different kinds of edible polyhydric alcohols, for optimum results I utilize, as the combining component with a nut butter, an edible polyhydric alcohol having more than three available hydroxyl groups in its composition. Commercially available edible polyhydric alcohols having such a composition are sorbitol and mannitol, and either of these alcohols are eminently suitable for providing my improved nut flavoring additives. I have found that the hydroxyl group of such an edible alcohol as sorbitol or mannitol have a tendency to bond with the solids content of the nut butter, or the solids containing protein. I have further found that such affinity between the hydroxyl group and the protein solids persists when the nut flavouring additive is introduced into a food residing in an aqueous environment. By way of example and employing peanuts as the source of the protein solids, I have produced an optimum nut flavoring additive for use in an aqueous environment, such as in ice creams, cake mixes or the like. My improved additive for use in such an environment comprises a comminuted mass of nuts that have been roasted, blanched and shelled in the conventional manner and thereafter ground sufficiently to provide an homogeneous peanut butter mass including the liquid phase consisting of peanut oil. To this peanut butter mass I add a quantity of an aqueous solution of the above mentioned edible polyhydric alcohol. For industrial manufacture of ice cream having a peanut butter flavor, I preferably provide a peanut flavoring additive wherein the edible hexahydric alcohol, such as sorbitol, constitutes approximately 59% or 60% by weight, of the entire additive, with the sorbitol preferably introduced into the additive as a 70% aqueous solution. This peanut flavoring additive has been combined effectively with ice creams in the ratio of 20 ounces of additive to five gallons of ice cream, and provides a delightfully tasteful ice cream with peanut butter flavor that persists over appreciable storage periods without the development of off flavors or odors. In cake mixes manufactured in large volume, as an industrial project, the peanut butter flavoring additive may contain approximately 50% to 60%, by weight, of sorbitol or mannitol with the same optimum results indicated above with respect to ice creams.

In either of the foregoing instances, the bond between the hydroxyl groups of the hexahydric alcohol, such as sorbitol or mannitol, and the peanut butter protein solids present appears to persist after the introduction of the nut flavoring additive to the foods residing in an aqueous environment, such as ice creams or cake mixes. It is thought that such affinity between such hydroxyl groups and the proteins is sufficiently strong in the foods having an aqueous environment to inhibit the development of typical bitter or acrid flavors as well as off or side flavors that normally would ensure when roasted peanuts, or other nuts, or peanut butters or other nut butters, reside in an aqueous environment. The obviating of these undesirable flavors makes peanut butter and other nut butters more amenable for use in aqueous environments.

The prepared nut flavoring additive or product of my present invention affords in itself an excellent condiment or spread for other foods, the additive constituting a flavoring base, per se. As a modification of the foregoing preferred embodiment, and in many instances wherein the additive may be employed as a spread, the percentage of edible hexahydric alcohol combined with the butter solids can vary between approximately 1% to 10%, by weight, of the entire product especially when the product is employed in the kitchens of households where the nut flavor is added to other foods for its pleasing and contrasting taste. A nut butter, such as peanut butter, containing 1% to 10% of a 70% aqueous solution of sorbitol has been found to blend well with a variety of different foods, as a condiment, and can be used with optimum results solely as a spread for bread, cookies and the like.

For industrial uses in an aqueous environment, however, it is preferable that the nut flavoring additive contain an appreciably higher percentage of hexahydric alcohol, ranging from 50% to 60%, by weight, of the additive to prevent the development of the acrid and off flavors that otherwise would develop with nut butters present.

Optimum flavoring additives of the aforementioned kind have been achieved by utilizing the product described and claimed in my United States Letters Patent, No. 2,552,925, as one component and utilizing commercially available sorbitol or mannitol, as the other component.

It is to be understood that the appended claims are to be accorded a range of equivalents commensurate in scope with the advance made over the prior art.

I claim:

1. A nut flavoring additive comprising nut butter containing an aqueous solution of a polyhydric alcohol selected from the group consisting of sorbitol and mannitol.

2. A nut flavoring additive comprising nut butter containing sorbitol having its hydroxyl groups bonded to the protein solids of the nut butter, such bonded state persisting while the additive is combined with other comestibles to inhibit the development of undesirable flavors.

3. A nut flavoring additive for combination with foods in an aqueous environment; said additive comprising nut butter containing aqueous sorbitol having its hydroxyl groups substantially bonded to the protein solids of the nut butter, such bonded state persisting while the additive is combined with foods in an aqueous environment to inhibit the development of undesirable odors from the nut butter in such environment.

4. A nut flavoring additive comprising nut butter containing between 1% and 10% by weight of mannitol having its hydroxyl groups bonded to the protein solids of said nut butter.

5. A nut flavoring additive comprising nut butter containing between 1% and 10% by weight of aqueous sorbitol.

6. In combination with a food in an aqueous environment, a nut flavoring additive comprising nut butter containing a major portion, by weight, of sorbitol having its hydroxyl groups substantially bonded to the protein solids of the nut butter, the bonded state persisting while combined with said food in an aqueous environment to inhibit the development of undesirable odors from the presence of the nut butter in said aqueous environment.

7. In combination with ice cream, a nut flavoring additive comprising nut butter containing sorbitol having its hydroxyl groups substantially bonded to the protein solids of said nut butter and wherein the said alcohol is the major constituent of the said nut flavoring additive.

8. In combination with ice cream, a nut flavoring additive comprising nut butter containing aqueous sorbitol as the major constituent of the said nut flavoring additive.

9. A new nut-flavored product of ice cream comprising ice cream, and a nut flavoring additive consisting of nut butter and sorbitol.

10. In combination with a cake mix, a nut flavoring additive comprising nut butter containing aqueous sorbitol as the major constituents of said nut flavoring additive.

11. The new product of a food containing appreciable moisture, and a nut flavoring additive containing aqueous sorbitol as a major constituent of said additive.

12. A new nut-flavored product, comprising appreciable moisture, a nut flavoring additive, and sorbitol.

References Cited in the file of this patent

UNITED STATES PATENTS

| | | |
|---|---|---|
| 2,166,806 | Du Puis et al. | July 18, 1939 |
| 2,552,925 | Avera | May 15, 1951 |
| 2,631,104 | Welker | Mar. 10, 1953 |
| 2,860,053 | Avera | Nov. 11, 1958 |

OTHER REFERENCES

"Sorbitol," by Childs, The Manufacturing Confectioner, October 1945, pp. 26 and 28.